No. 857,030. PATENTED JUNE 18, 1907.
E. M. COOK.
METALLIC PACKING.
APPLICATION FILED SEPT. 22, 1906.

Witnesses
Frank Hoyd
H. Allen

Inventor
Edward M. Cook,
By Victor J. Evans
Attorney

THE NORRIS PETERS CO., WASHINGTON, D. C.

UNITED STATES PATENT OFFICE.

EDWARD M. COOK, OF OBERLIN, OHIO.

METALLIC PACKING.

No. 857,030.　　　Specification of Letters Patent.　　　Patented June 18, 1907.

Application filed September 22, 1906. Serial No. 335,764.

*To all whom it may concern:*

Be it known that I, EDWARD M. COOK, a citizen of the United States, residing at Oberlin, in the county of Lorain and State of Ohio, have invented new and useful Improvements in Metallic Packings, of which the following is a specification.

The invention relates to an improvement in metallic packings and particularly to the cage designed in use to obviate the necessity for gland nuts, studs, etc.

The main object of the present invention is the production of a sectional cage designed when connected to provide for removable engagement with the bore in the end of the cylinder and to insure proper and effective support of the packing rings.

The invention will be described in the following specification, reference being had particularly to the accompanying drawings, in which:—

Figure 1:
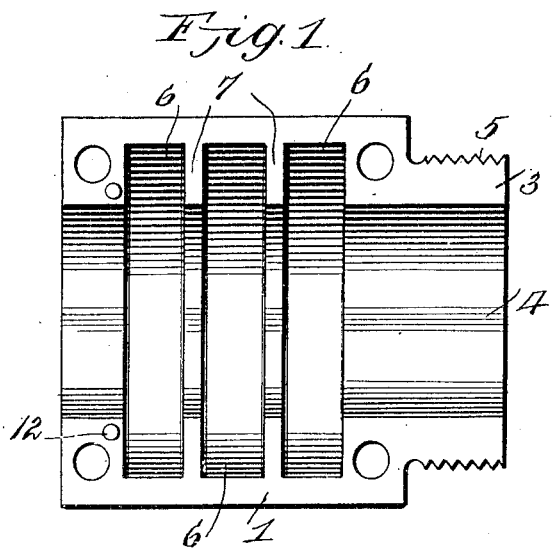
Figure 2:
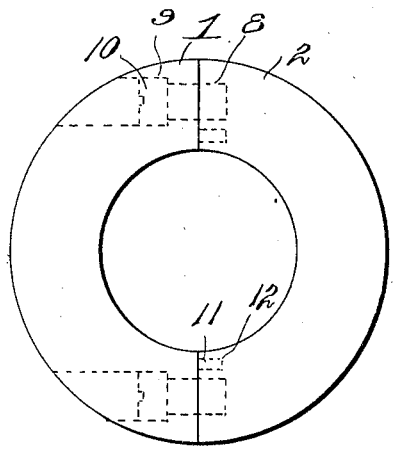

Figure 1 is an elevation of one of the sections of the cage, Fig. 2 is an end view of the cage in complete form, the means of connection being shown in dotted outline.

Referring particularly to the drawings my improved packing and cage comprises a cylindrical body divided longitudinally to provide semi-cylindrical sections 1 and 2. Each section is provided with a semi-cylindrical extension 3 centrally disposed relative to the bore 4 of the cage and of less diameter than the diameter of the main portion of the section. Each extension 3 is exteriorly threaded at 5 to provide when the sections are assembled a sleeve like extension exteriorly threaded and of less diameter than the diameter of the cage proper. Each section of the cage is provided within the main body with a centrally disposed packing chamber 6, preferably divided by annular inwardly projecting flanges 7 to provide for the reception of a series of packing rings. Beyond the bore of the cage the respective end walls of the packing chamber 6 of the respective sections are formed with means for securing the sections together. In the present instance section 2 is formed at the point engaged with threaded openings 8, while section 1 is formed with bolt receiving openings 9, the openings in section 1 extending through the peripheral surface of the section. By this means when the sections are assembled threaded bolts, as 10, may be introduced into the openings 9 and threaded into the openings 8, serving to bind the sections securely together. By preference the opening 9 is shaped to correspond with the contour of the bolt 10, whereby the head of the bolt is designed when in place to bear against a shoulder or offset formed in the opening 9 with the effect to provide a more secure fastening of the parts. The relatively forward wall 6 is provided with an additional means for preventing independent endwise movement of the section when connected, such means preferably comprising a dowel pin 11 projecting from one of the sections, as 1, and designed to seat in a suitable opening, as 12, appropriately formed in the other section, all as clearly seen in Fig. 2.

The sections when assembled as described are designed to be secured in the bore of the cylinder by engaging the threaded sleeve with said bore, the latter being suitably threaded for the reception of the sleeve. By this arrangement the securing of the cage to the cylinder acts as an effective means for securing the respective sections of the cage against independent movement, as will be obvious.

The use of the cage entirely dispenses with the necessity of the ordinary stuffing box, gland nuts, folding studs or the like, as the packing is readily and conveniently renewed when desired and together in effect adjusted relative to the shaft through the medium of the bolts 10.

Having thus described the invention what is claimed as new, is:—

A packing cage comprising semi-cylindrical sections, each having a reduced threaded semi-cylindrical extension, one of the sections being formed with threaded openings and the other section formed with registering bolt holes opening through the peripheral surface of the section, pins projecting from one of the sections and adapted to seat in openings formed in the other section, said pins and co-operating openings being arranged between the co-operating bolt holes and openings and the shaft opening, and said bolt holes and openings being arranged in longitudinal alinement with the threaded surface of the extensions, whereby the connecting means of the section includes the bolts and threaded extension, and are arranged in alinement to afford the maximum holding effect.

In testimony whereof, I affix my signature in presence of two witnesses.

EDWARD M. COOK.

Witnesses:
 CHARLES A. HAMMOND,
 V. O. JOHNSTON.